(12) United States Patent
Zeiler (10) Patent No.: US 11,834,095 B2
(45) Date of Patent: Dec. 5, 2023

(54) UTILITY VEHICLE BRAKING

(71) Applicant: AGCO International GmbH, Neuhausen (CH)

(72) Inventor: Hans-Peter Zeiler, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 312 days.

(21) Appl. No.: 16/770,488

(22) PCT Filed: Oct. 26, 2018

(86) PCT No.: PCT/EP2018/079463
§ 371 (c)(1),
(2) Date: Jun. 5, 2020

(87) PCT Pub. No.: WO2019/110198
PCT Pub. Date: Jun. 13, 2019

(65) Prior Publication Data
US 2021/0179171 A1 Jun. 17, 2021

(30) Foreign Application Priority Data
Dec. 8, 2017 (GB) .................................... 1720471

(51) Int. Cl.
*G06F 17/00* (2019.01)
*B62D 11/08* (2006.01)
(Continued)

(52) U.S. Cl.
CPC .............. *B62D 11/08* (2013.01); *B60T 11/21* (2013.01); *B60T 8/322* (2013.01); *B60W 30/045* (2013.01); *B60W 2720/403* (2013.01)

(58) Field of Classification Search
CPC .......... B62D 11/08; B60T 11/21; B60T 8/322; B60T 8/246; B60W 30/045; B60W 2720/403
(Continued)

(56) References Cited

U.S. PATENT DOCUMENTS 4,757,870 A * 7/1988 Torii ...................... B60K 17/35
180/197
4,949,265 A * 8/1990 Eguchi ................. B60K 17/358
701/42
(Continued)

FOREIGN PATENT DOCUMENTS

DE 9204417 U1 7/1992
DE 102005011621 A1 * 10/2005 .............. B60T 11/21
(Continued)

OTHER PUBLICATIONS

Carthology (Year: 2015).*
(Continued)

*Primary Examiner* — Ronnie M Mancho (57) ABSTRACT

A method of brake steering in a four-wheel drive utility vehicle having a driven front axle carrying at least two front wheels, a driven rear axle carrying at least two rear wheels, a powertrain delivering torque to the front and rear axles via a connecting shaft, independently operable service brakes on each of the front and rear wheels, and independently operable parking brakes on each of the rear wheels. The method includes, on the vehicle entering a turn, applying the service brakes of the front and rear wheels on the inside of the turn and applying also, and to a controllably varied level of braking force, the parking brake on the rear wheel on the inside of the turn.

11 Claims, 6 Drawing Sheets

(51) Int. Cl.
*B60T 11/21* (2006.01)
*B60T 8/32* (2006.01)
*B60W 30/045* (2012.01)

(58) Field of Classification Search
USPC .......................................................... 303/9.61
See application file for complete search history.

(56) References Cited

U.S. PATENT DOCUMENTS

| | | | | |
|---|---|---|---|---|
| 5,140,524 | A * | 8/1992 | Matsuda | B60T 8/1755 701/72 |
| 5,470,135 | A * | 11/1995 | Shitani | B60K 23/04 303/DIG. 6 |
| 5,631,829 | A * | 5/1997 | Takasaki | B60K 23/0808 701/1 |
| 5,752,211 | A * | 5/1998 | Takasaki | B60K 23/0808 701/88 |
| 5,803,197 | A * | 9/1998 | Hara | B60K 23/0808 180/248 |
| 6,089,677 | A * | 7/2000 | Fukumura | B60T 8/326 303/167 |
| 6,556,909 | B2 * | 4/2003 | Matsumoto | B62D 7/159 180/401 |
| 7,693,639 | B2 * | 4/2010 | Suzuki | B60T 8/1755 701/91 |
| 8,831,851 | B2 * | 9/2014 | Canuto | B60T 8/246 701/72 |
| 2004/0267427 | A1 * | 12/2004 | Suzuki | B60T 8/1755 701/69 |
| 2010/0016123 | A1 * | 1/2010 | Kodaka | B60T 8/00 477/186 |
| 2011/0006591 | A1 * | 1/2011 | Yoshii | B60T 13/745 303/4 |
| 2012/0253625 | A1 * | 10/2012 | Canuto | B62D 11/003 701/72 |
| 2014/0206502 | A1 * | 7/2014 | Dix | F16H 61/66 477/68 |
| 2015/0328983 | A1 * | 11/2015 | Takaira | B60K 17/354 180/233 |
| 2018/0265053 | A1 * | 9/2018 | Fujiki | B60T 7/12 |

FOREIGN PATENT DOCUMENTS

| | | | | |
|---|---|---|---|---|
| EP | 0295396 A2 | 12/1988 | | |
| EP | 0 863 063 A1 | 9/1998 | | |
| EP | 2412608 A1 * | 2/2012 | | B62D 5/0472 |
| EP | 2896540 A1 | 7/2015 | | |
| EP | 2935948 | 10/2015 | | |
| EP | 3 028 908 A1 | 6/2016 | | |
| GB | 2 547 084 A | 8/2017 | | |
| JP | H09104339 A * | 4/1997 | | B60T 8/88 |
| JP | 2005280596 A * | 10/2005 | | |
| JP | 2011 051561 A | 3/2011 | | |
| JP | 2012166701 A * | 9/2012 | | |
| KR | 20130052792 A | 5/2013 | | |
| WO | 2010/031722 A1 | 3/2010 | | |
| WO | 2010/066864 A1 | 6/2010 | | |
| WO | WO-2011029864 A1 * | 3/2011 | | B60T 11/21 |

OTHER PUBLICATIONS

UK Intellectual Property Office, Search Report for Priority Application No. GB1720471.0, dated May 11, 2018.
European Patent Office, International Search Report for related International Application No. PCT/EP2018/079463, dated Jan. 30, 2019.

* cited by examiner

UTILITY VEHICLE BRAKING

TECHNICAL FIELD

The present invention relates to braking systems for utility vehicles, particularly self-propelled four-wheel drive agricultural machines, and more particularly to such systems where controlled braking is applied to the inner wheels of a turning vehicle in order to reduce turning radius.

BACKGROUND

With the growing size of agricultural machinery, the net power of agricultural machines such as tractors is also increasing. This also results in an increase in tire size to transfer the power to the ground. The increasing tire size also helps to reduce soil compaction which has negative impact on crop growth. However, the increased tire size has the result that, when the vehicle is turning, parts of the tires move towards the area where the engine is installed (engine periphery). Therefore there is a limitation in steering angle which impacts the steering capability in terms of turning radius, but the minimum turning radius is very important for maneuverability (e.g. when turning on a headland in a field). In addition, stricter exhaust gas emission requirements result in more installation space being required in the front area (e.g. for cooling systems or exhaust emission treatment systems), especially in the engine periphery penetrated by the tires during steering. Enlarging the installation space in this area, especially the width transverse to driving direction, limits the steering angle of the tractor. A narrow track width also limits the steering angle which is an issue for e.g. the US market which has a strong demand for narrow-tracked tractors so that the tires are able to move along narrow crop rows.

To mitigate the aforementioned problems it is known to have a steering brake system. An example of a brake arrangement for steering braking of a utility vehicle is described in commonly-assigned European patent EP 2896540 B1. The vehicle has a cardan brake acting on the front axle, and separate left and right service brakes on the rear wheels. The left rear service brake is activated by movement of a first brake lever and the right rear service brake is activated by movement of a second brake lever. The left and right rear service brakes and the cardan brake are activated together by movement of both brake levers. To apply steering braking, only one of the brake levers is applied.

Utility vehicles intended for operation at relatively higher speeds are normally provided with two separate braking circuits and service brakes on each axle, whereby each circuit is assigned to one axle (in cars, the split is more commonly transverse). In consequence, for a utility vehicle the service brake force ratio for front and rear axle is thereby 50/50 which means that each axle is provided with only 50% of the total available braking force under normal operation. In the case of steering braking only with the rear axle (as in EP 2896540 B1, discussed above), the braking of only one side results in only half of the rear axle capacity being used, so only 25% of the total available braking force is applied. Compared to vehicles without front service brakes (which provide 100% of the steering force on the rear axle and 50% on one side during steering braking) this results in a major disadvantage of insufficient steering brake capability.

The main effect used during steering braking is that the braking of the rear axle on one side results in that the vehicle being virtually rotated about a vertical axis towards the inner curve side (similar to a track type tractor during differential steering). The front of the tractor is thereby moved out of the track which is given by the Ackermann-steering-track. The high weight of modern high horse power tractors is also present at the front and increases the front axle load. In combination, with the bigger wheel sizes on all axles, it is getting increasingly difficult to move the inner front wheel inwards during steering braking.

BRIEF SUMMARY

In accordance with a first aspect of the invention there is provided a method of brake steering in a four-wheel drive utility vehicle having a driven front axle carrying at least two front wheels, a driven rear axle carrying at least two rear wheels, a powertrain delivering torque to the front and rear axles via a connecting shaft, independently operable service brakes on each of the front and rear wheels, independently operable parking brakes on each of the rear wheels, the method comprising;

on the vehicle entering a turn, applying the service brakes of the front and rear wheels on the inside of the turn and applying also, and to a controllably varied level of braking force, the parking brake on the rear wheel on the inside of the turn.

In addition to facilitating tighter turning in e.g. headland turns for big tractors, the controllably varied application of parking brake force to augment the service brakes during steering braking results in more efficient curve driving, with reduced scrubbing leading to a reduction in soil damage. Furthermore, power is better transferred to the ground for better efficiency.

Preferably, the level of parking brake braking force applied to a rear wheel on entering a turn is substantially proportional to the level of service brake braking force applied to the same wheel.

Preferably, the level of service brake braking force applied during a turn may be determined by the level of pressure exerted by a user of the vehicle on a brake control of the vehicle.

Also in accordance with the present invention there is provided a driveline for a four-wheel drive utility vehicle comprising:
- a driven front axle carrying at least two front wheels;
- a driven rear axle carrying at least two rear wheels;
- a powertrain delivering torque to the front and rear axles via a connecting shaft;
- independently operable service brakes on each of the front and rear wheels;
- independently operable parking brakes on each of the rear wheels. A control system is coupled with the powertrain, service and parking brakes, and configured to detect when the vehicle enters a turn, apply the service brakes of the front and rear wheels on the inside of the turn, and also, and to a controllably varied level of braking force, the parking brake on the rear wheel on the inside of the turn.

Further features of the driveline are recited in the attached claims, to which attention is now directed, and the disclosures of which are incorporated herein by reference.

Further in accordance with the present invention there is provided a utility vehicle including a driveline as set forth above. The utility vehicle may further comprise a geographical positioning system coupled with the control system, with the control system being configured to not implement the above-recited method of brake steering on determination that the vehicle is outside of a predetermined geographical area.

BRIEF DESCRIPTION OF THE DRAWINGS

Further advantages of the invention will become apparent from reading the following description of specific embodiments with reference to the appended drawings in which.

DETAILED DESCRIPTION

Figure 1:
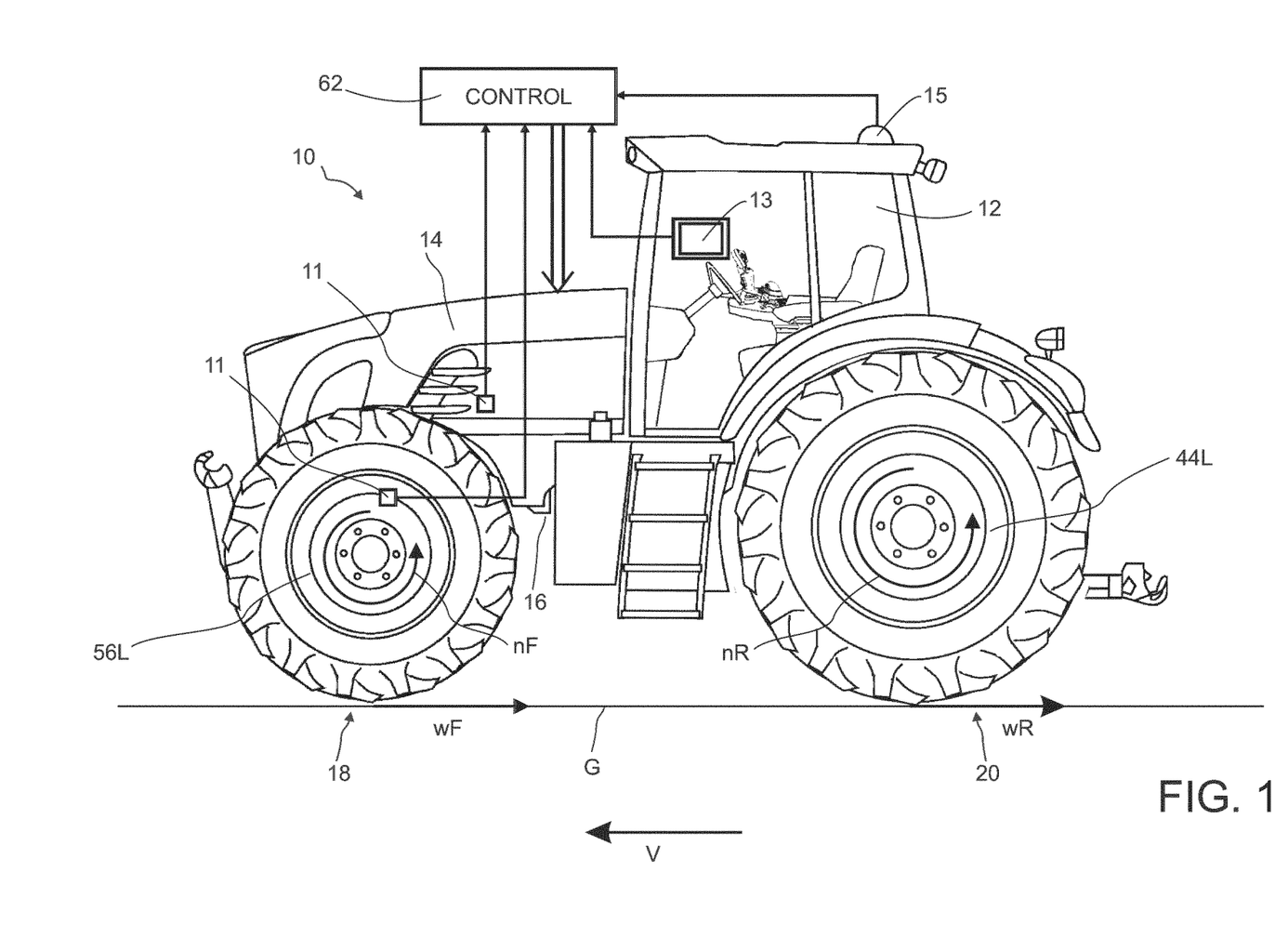
FIG. 1 is a representation of a utility vehicle, in the form of a tractor, suitably provided with a braking system embodying the present invention.

Referring to FIG. 1, a utility vehicle in the form of a tractor 10 is shown having a cab 12 and an engine compartment 14. A chassis 16 which is partly visible connects a front wheel suspension and axle assembly (indicated generally at 18) and a rear axle assembly (indicated generally at 20). A vehicle control system (represented schematically at 62) is coupled to receive data from a number of sensors 11. Such data may include (but is not limited to):

gross weight of the vehicle;
amount of front and/or rear ballasting carried by the vehicle;
weighting information pertaining to a towed or carried implement;
extent of measured wheel-slip for one or more wheels of the vehicle;
tire pressure in one or more tires on respective wheels of the vehicle;
angle of turn directed by a user of the vehicle;
current speed of the vehicle;
ambient conditions external to the vehicle.

Further inputs to the control system 62 may come from a user-operable input device such as a touchscreen display and input device 13 positioned in the vehicle cab 12, and a geographical positioning system 15 for the vehicle.

Figure 2:
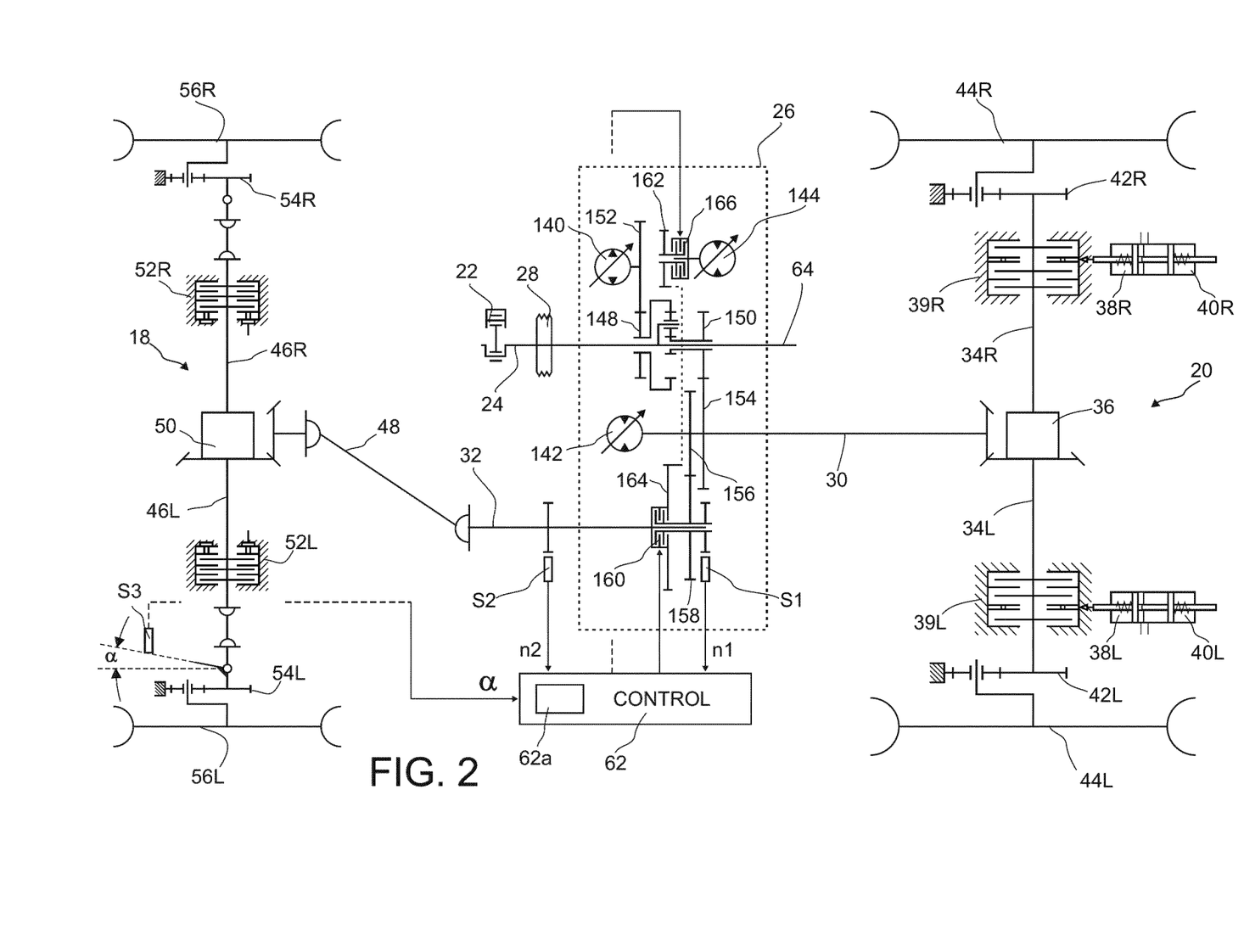
FIG. 2 is a schematic representation of the driveline arrangement of the tractor of FIG. 1.

Referring additionally to the driveline arrangement of FIG. 2, a prime mover such as an internal combustion engine 22 drives an input shaft 24 of a gearbox/transmission unit 26 via a flywheel 28. The transmission 26 drives front and rear drive shafts 32, 30 to provide propulsive drive to the respective axle assemblies 18, 20. In addition to providing propulsive drive, the transmission 26 also provides drive to a rear power take-off drive shaft 64.

The transmission input shaft 24 is connected at its inboard end to a planetary gear assembly indicated generally at 148. The purpose of the planetary gear assembly 148 is to split the torque provided by the input shaft 24 between a mechanical branch indicated generally at 150 and a hydrostatic branch indicated generally at 152. On the opposite side of the planetary gear assembly to the input shaft 24 is the rear power take off shaft 64.

The hydrostatic branch 152 drives a hydraulic pump 140. The mechanical branch 150 is connected to the front drive shaft 32 and rear drive shaft 30 as follows. Torque is transmitted from the mechanical branch 150 of the planetary gear assembly 148 to the rear drive shaft 30 via a rear axle gear 154. Mounted on the same shaft as the rear axle drive gear 154 is an intermediary gear 156 which in turn drives a front axle drive gear 158 which selectively drives the front drive shaft 32. A first clutch 160 is provided to selectively engage and disengage the front drive shaft 32 from the rear drive shaft 30 or to control the ratio of torque distribution between the two axles. This allows grip to be optimized dependent on the ground conditions.

In addition to the mechanical drive path described above, the hydraulic pump 140 is hydraulically connected (not shown in FIG. 2 for clarity) to a first hydraulic motor 142 which is driveably connected to the rear drive shaft 30 in order to provide hydraulic drive to the rear wheels. The hydraulic pump 140 is also connected in parallel to a second hydraulic motor 144 in order to provide hydraulic drive to the front drive shaft 32 as follows. The motor 144 is driveably connected to the front drive shaft 32 via first and second hydraulic motor gears 162, 164. A second clutch 166 allows the second hydraulic motor 144 to be selectively engaged and disengaged from the front drive shaft 32. This allows hydraulic drive to be provided to the front drive shaft 32 by the second hydraulic motor 144 in addition to, or alternatively to, the drive delivered to the front drive shaft 32 from the rear drive shaft 30 via the intermediary and front axle drive gears 156, 158, depending on the extent of engagement of the first clutch 160.

Second hydraulic motor 144 is connected to front drive shaft 32 by gears 162, 164 having a high transmission ratio. This allows motor 144 to provide high torque at a limited, lower range of vehicle speeds. Consequently, at higher vehicle speeds, the motor 144 may be disconnected from the driveline via second clutch 166. Due to the layout, the first hydraulic motor 142 is provided for delivering lower torque but over the full range of vehicle speeds. However, in combination, both motors 142, 144 enable the transmission to provide a full transmission output power with variable torque, variable vehicle speed, and variable driving direction over a full range of vehicle speeds.

Rear drive shaft 30 drives the vehicle rear axle left and right drive shafts 34L, 34R via rear axle differential 36. Note the designations "front", "rear", "left" and "right" as used herein are taken from the point of view of a user/driver facing forward in the cab 12. The rear axle assembly 20 further comprises left and right rear axle service brakes 38L, 38R (with respective park brakes 40L, 40R), left and right rear axle final drives 42L, 42R, and left and right rear wheels 44L, 44R. As shown, the service and park brakes may share a common set of brake disks 39L, 39R, with the service brake being spring-biased to the open position and the park brake spring-biased to the closed position. Such an arrangement is described in, e.g., German utility model DE9204417U1.

In like manner, front drive shaft 32 drives the vehicle front axle left and right drive shafts 46L, 46R via cardan shaft 48 and front axle differential 50. The front axle assembly 18 further comprises left and right front axle service brakes 52L, 52R, left and right front axle final drives 54L, 54R, and left and right front wheels 56L, 56R. The controlled clutch arrangement, comprising the first and second clutches 160, 166 under the direction of the vehicle control system 62 (described further below), the drive to the vehicle front wheels 56L, 56R may be selectively engaged or disengaged, or engaged with a controllably variable degree of clutch slippage to enable the engine output torque delivered to the axle assemblies 18, 20 to be controllably varied.

The first clutch 160 is also provided to control the wheel velocity or rotational speeds of the axle assemblies 18, 20 to avoid malfunction of the transmission 26. With reference to FIG. 1, the wheel velocity w is the velocity of a wheel in the contact point with the ground G and along the ground (radially). Considering a known wheel diameter, the rotational speed n of the wheel can be calculated, and based on that the wheel velocity, w can be determined by measuring the rotational speed n at any shaft in the driveline which is connected via a fixed, constant ratio to one of the axle assemblies 18, 20. If the vehicle is equipped with different tire sizes (requiring an overall gear ratio between front axle and rear axle, the wheel velocity wF (for front axle) and wR (for rear axle) should be equal under ideal conditions. However, with different front and rear tire diameters, the rotational speed nF of the front axle and the rotational speed nR of the rear axle are different.

But as the respective gear ratios in the driveline from a transmission 26 to a respective front or rear axle assembly 18, 20 are known, both rotational speeds nF, nR and also wF, wR can be monitored by measuring the rotational speed n at any shaft in the driveline which is connected to the respective wheel axle assemblies 18, 20.

Control system 62 is permanently monitoring the signals coming from speed sensors S1 and S2. Sensor S1 is connected to the rear drive shaft 30 with a fixed ratio so that sensor S1 provides a signal indicative of the rotational speed of rear drive shaft 30 (referred to as n1), rear axle left and right drive shafts 34L, 34R and thereby left and right rear wheels 44L, 44R. Sensor S2 is connected to the front drive shaft 32 with a fixed ratio so that sensor S2 provides a signal indicative of the rotational speed of front drive shaft 32 (referred to as n2), front axle left and right drive shafts 46L, 46R and thereby left and right front wheels 56L, 56R.

The necessity of monitoring speeds n1 and n2 in connection with the special transmission design described in applicant's pending European patent application EP 2935948 A1 is explained with reference to FIGS. 1 and 2. The pump 140, the first and second motors 142, 144 are provided with adjustment means (not shown), the adjustment means being operable by an actuator to vary the operating angle of the first and second motors 142, 144, respectively. Advantageously, the provision of a separate adjustment means for each of the motors 142, 144, allows the speed and torque output of the motors to be independently and flexibly controlled. This offers significant advantages in terms of vehicle control and efficiency. For example, different pivot angles can be provided for each motor, allowing one motor to pivot to zero displacement (represented by a pivot angle of 0 degrees or 45 degrees, depending on specification) while the torque or speed output of the other motor is further adjusted. Furthermore, as one motor can be pivoted to zero displacement while the second motor is at a displacement above zero, the first motor can be disconnected by clutch 166. Accordingly, the control system 62, and particularly the relationship between the displacement of first and second motor 142, 144, can be adapted. This allows the transmission system to be readily configured for different applications. It must be understood that the adjustment means is controlled depending on the vehicle speed v and that the adjustment means is designed so that for each vehicle speed v, a displacement (pivot angle) for pump 140, first and second motor 142, 144 is predetermined. This means that at e.g. a vehicle speed of, for example, 8 kph (kilometers per hour) pump 140, first and second motor 142, 144 are adjusted to first set of displacements; at another speed, for example, 25 kph, pump 140, first and second motor 142, 144 are adjusted to second set of displacements. For each vehicle speed v, a predetermined displacement for pump 140, first and second motor 142, 144 is assigned which cannot be adapted in relation to each other.

When the tractor 10 is driven at constant vehicle speed v over ground G, the wheel velocity for front and rear axle wF and wR should be the same if wheel-slip is equal for both axles (in simple terms, the ground G under the wheels shows the same condition). A wheel-slip of 10% (which is typical for soft ground like fields) would mean that the wheel velocity for front and rear axle wF and wR is 10% higher than the vehicle speed.

Looking now at the rotational speed of the axles of a tractor with both front axle and rear axle being equipped with tires of the same size (in terms of the outer diameter), the rotational speed nF and nR is equal, so the rotational speed n1 determined by sensor S1 and the rotational speed n2 determined by sensor S2 are also equal. If a tractor with different tire sizes (in terms of the outer diameter) is regarded, rotational speed nF and nR would be different due to overall gear ratio between front axle and rear axle. So a comparison of the rotational speeds n1 and n2 to arrive at the deviation/difference in wheel velocity or rotational speed of front and rear axle wF and wR would require inclusion of the overall gear ratio. As this is standard engineering knowledge, the following description considers equal tire sizes for both axle assemblies 18, 20 so that the overall gear ratio need not be applied and considered. Based on that, some operating conditions of the tractor 10 are now described in detail:

Driving Straight Ahead with Both Axles on Same Ground

When driving straight ahead, the wheel velocity wF and wR and (for equal tire sizes) rotational speed nF and nR of front and rear axle assemblies 18, 20 should be equal if both axles drive on similar ground G. In this condition, the clutch 160 is disengaged so that first hydraulic motor 142 is driving the rear axle assembly 20 via rear drive shaft 30 without any connection to front drive shaft 32, which is driven by second motor 144 to drive front axle assembly 18 (when clutch 166 is engaged). This condition is preferred as independent drive for the axles is provided and torsional stresses in the driveline can be avoided. However, there are situations where the engagement of clutch 160 is advantageous.

Driving Straight Ahead with Both Axles on Different Ground

If the front axle assembly 18 or one front wheel 56L, 56R is now driving on sandy or frozen ground (with the rear axle still driving on hard soil) while the clutch 160 is disengaged, the front axle assembly 18 would start spinning (as the torque supplied cannot be transferred to the ground). In terms of the wheel velocity, this means that the wheel velocity wF and rotational speed nF of the front axle assembly 18 would increase considerably compared to the wheel velocity wR and rotational speed nR of the rear axle assembly 20 or, in other words, the wheel velocity difference Dw=wF−wR or Dn=nF−nR (being ideally zero) would increase. As a consequence, the fluid supplied by pump 140 would be completely consumed by second hydraulic motor 144 (due to missing resistance/torque support) so that first hydraulic motor 142 would stand still. In other words, when looking at the pressure in the supply circuit for pump 140, and first and second motors 142, 144, due to the missing torque support at second motor 144, the oil would flow at a minimal pressure level (nearly pressureless) in second motor 144 assigned to front axle assembly 18. As both motors 142, 144 are connected in the same hydraulic circuit (in parallel), the same minimal pressure level would impinge first motor 142 assigned to rear axle assembly 20. As a result, first motor 142 cannot supply torque. With front axle assembly 18 spinning on sandy or iced ground and rear axle assembly 20 standing still, the tractor would just slow down and stop. Changing the vehicle speed to adjust speeds and torque supplied by motors 142, 144, may help to a certain degree but not on ground which is glassy frozen. Furthermore reducing speed is not advantageous during agricultural work (e.g. plowing or seeding) as the work result may suffer.

Opening clutch 166 without second motor 144 adjusted to zero displacement would have the same result. This condition is only intended for higher speeds at which the adjustment means changing second motor 144 to zero displacement and the clutch 166 is disengaged while first motor 142 is adjusted to displacement above zero.

To avoid the unintended standstill of the tractor on sandy or iced ground, the control unit 62 is permanently adjusting the engagement of the clutch 160 as explained below:

During Straight Ahead Drive

The monitoring process includes that the determined rotational speeds of sensors S1 and S2, are permanently compared to detect the wheel velocity difference/rotational speed difference. If during straight-ahead driving the value of the wheel velocity difference/rotational speed difference exceeds a first wheel velocity difference threshold value, such as 5% (meaning that wheel velocity wF is 5% higher than wheel velocity wR), the control unit controllably engages clutch 166 until the first wheel velocity difference threshold value is undercut again. If the front axle assembly 18 spins on a sandy surface, this would result in further engagement of the clutch so that the second motor 144 is drivingly connected to the rear axle assembly 20, which can support the torque to avoid spinning. This would also keep first motor under supply to drive the rear axle assembly 20. The vehicle would not be forced into standstill then. This method keeps independent drive of both axle assemblies 18, 20 upheld most of the time to avoid torsional stresses in the driveline.

During Turning

During a driven turn (determined by steering sensor S3), a second wheel velocity difference threshold value is considered. Based on the fact that during a turn, due to Ackermann steering constraints, the steered front wheels roll on a greater curve radius (path) so that they have to speed up to pass the curved path at the same time compared to the rear wheels. So during turning, the clutch control unit 62 would consider a second wheel velocity difference threshold value, which may be 15 to 20%. This higher level for the velocity difference threshold enables the vehicle to pass the curve, but the spinning prevention is still active, so that in the case when the front wheels drive via icy surface in the curve, the system can still react.

During Steering Braking

During a braking turn (determined by steering sensor S3 and the activation of the steering brake), a third wheel velocity difference threshold value is considered. In case of steering braking, the inner steered wheel is braked while the steered outer wheel should support the steering brake by speeding up to further drag the vehicle into the curve.

So during turning, the clutch control unit 62 would consider a third wheel velocity difference threshold value, which may be 30%. This enables the vehicle to pass the curve and steering brake but the spinning prevention is still active, so that in the case when the front wheels drive via icy surface in the curve, the system can still react.

The values for second wheel velocity difference threshold and third wheel velocity difference threshold value thereby depend on the geometry of the vehicle (wheel distance or wheelbase, maximum steering angle $\alpha$, track width) as these parameters influence the path driven during a turn which themselves influence the wheel speed differences which must be allowed.

For a vehicle with a smaller wheel distance (distance between the axles in driving direction) the threshold value may be reduced (assuming that no other geometry changes).

For a vehicle with a smaller track width (distance between wheels of an axle transverse to driving direction) the threshold value may be reduced (assuming that no other geometry changes).

For a vehicle with a reduced maximum steering angle $\alpha$, the threshold value may be reduced (assuming that no other geometry changes).

While the wheel distance may not be easily changed on a vehicle, the track width can be adapted with special axle arrangements (known as stub axles in the USA) so that also the steering angle may be limited. Alternately, the steering angle may be limited by attaching a front loader. The values for the velocity difference thresholds, which are suitably held in a data storage device 62a of the control system 62, may be adapted by the driver via the input device 13, or by the control system 62 recognizing these configurations.

Figure 3:
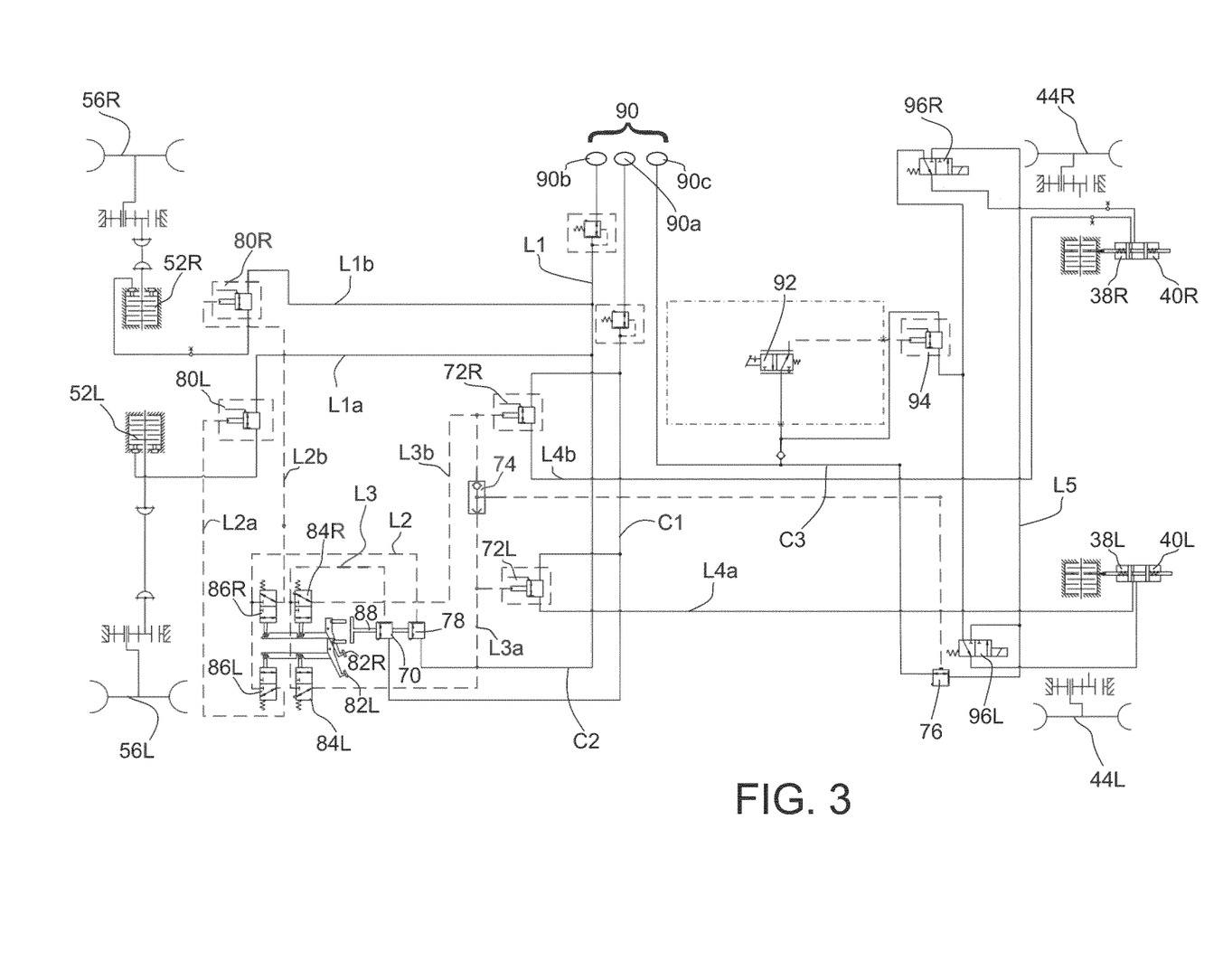
FIG. 3 is a schematic circuit diagram of a first embodiment of a pneumatically operable brake system for the tractor of FIG. 1.

FIG. 3 shows a schematic circuit diagram of a pneumatically operable brake system for the tractor 10 of FIG. 1. A first brake circuit C1 is provided for activating left and right rear service brakes 38L, 38R individually for application to left and right rear wheels 44L, 44R respectively. This first brake circuit C1 comprises a first pressure control valve 70 and supply lines L3, L3a, L3b, L4, L4a and L4b. Left and right rear service brakes 38L, 38R are operated by respective left and right associated brake relay valves 72L, 72R. Lines L3a and L3b are linked by a shuttle valve 74 which passes the greater pressure in either of the lines to proportional valve 76 in the control circuit for rear park brakes 40L, 40R (described below).

A second brake circuit C2 is provided for activating left and right front service brakes 52L, 52R individually for application to left and right front wheels 56L, 56R respectively. This second brake circuit C2 comprises a second pressure control valve 78 and supply lines L1, L1a, L1b, L2, L2a and L2b. Left and right front service brakes 52L, 52R are operated by respective left and right associated brake relay valves 80L, 80R.

The service brakes 38L, 38R, 52L, 52R are activated by the driver by two levers, such as two foot pedals 82L, 82R. Left or first foot pedal 82L, when pressed opens a left rear brake valve 84L and a left front brake valve 86L. Right or second foot pedal 82R when pressed opens a right rear brake valve 84R and a right front brake valve 86R. Pedals 82L, 82R will activate a piston or pistons 88 of a cylinder or cylinders (not shown) which activate the first and second pressure control valves 70, 78. Movement of either or both of the pedals 82L, 82R will activate both of the first and second pressure control valves 70, 78.

The service brakes 38L, 38R, 52L, 52R are connected to a fluid supply 90 such as a compressor, or air chamber via their respective brake relay valves 72L, 72R, 80L, 80R. When neither pedal 82L nor pedal 82R is pressed, the brake relay valves 72L, 72R, 80L, 80R are in a closed position which means that the brakes 38L, 38R, 52L, 52R are not activated. Each brake circuit C1, C2 is connected to a separate fluid reservoir of the fluid supply 90. The first brake circuit C1 including first control valve 70 is connected to fluid supply 90a, and the second brake circuit C2 including second control valve 78 is connected to fluid supply 90b.

The first control valve 70 switches left associated rear brake valve 72L, or right associated rear brake valve 72R, or both of them, to an open position via left and/or right brake valves 84L, 84R. When the associated rear brake valve 84L, 84R is open, the respective rear service brake 38L, 38R is activated. Associated rear brake valves 84L, 84R are connected in parallel.

The second control valve 78 switches left associated front brake valve 80L, or right associated front brake valve 80R, or both of them, to an open position via left and/or right brake valves 86L, 86R. When the associated front brake valve 86L, 86R is open, the respective front service brake 52L, 52R is activated. Associated front brake valves 86L, 86R are connected in parallel.

When neither of the pedals 82L, 82R is moved, the front and rear brake valves 86L, 86R, 84L, 84R are biased to a closed position.

During road operation, legal regulations require simultaneous braking on both sides. Therefore, the two foot pedals 82L, 82R must be connected by a locking means (not shown) so that only simultaneous movement is possible. This locking means can be provided as a pin which engages through the two foot pedals 82L, 82R and which is operated by the driver. Alternatively, the locking means may be engaged automatically, e.g. above a certain vehicle speed. Such locking means are described in applicant's published patent application WO2010/066864.

When both foot pedals 82L, 82R are pressed together, piston 88 activates first and second control valves 70, 78 and at the same time the front and rear brake valves 86L, 86R, 84L, 84R are opened. Air flows from the fluid supply 90b, along line L1, through second control valve 78, along line L2 through the front brake valves 86L, 86R and through to the respective front brake valves 80L, 80R which switches valves 80L, 80R to an open position. Air can then flow from the fluid supply 90b along line L1 and parallel lines L1a and L1b to the respective front service brakes 52L, 52R. At the same time, air also flows from the fluid supply 90a, along line L4 through first control valve 70, along line L3 through left and right brake valves 84L, 84R and along lines L3a, L3b through to associated brake relay valves 72L, 72R which switch valves 72L, 72R to an open position. Air can then flow from air supply 90 a through line L4, through lines L4a and L4b to activate rear service brakes 38L, 38R.

If the driver wishes to apply the brakes on one side only, for example the left front service brake 52L and left rear service brake 38L to help him steer left around a bend, the driver pushes the left foot pedal 82L only, after disengaging the above-mentioned locking means connecting the two foot pedals 82L, 82R during road operation.

The rear park brakes 40L, 40R are controlled by a park brake control circuit C3 connected to a further separate reservoir 90c of fluid supply 90. In conventional operation, a park brake control valve 92, activated by a hand brake lever, is operable to connect the fluid supply, via a relay valve 94 and respective left and right rear solenoid valves 96L, 96R, to release the park brakes 40L, 40R (and doing park brake force). The solenoid valves 96L, 96R are spring biased to the operating position shown in which the output of relay valve 94 is connected to the park brakes 40L, 40R.

To enhance the brake steering operation, the park brakes 40L, 40R are used to supplement the braking pressure applied by the rear service brakes 38L, 38R. The fluid supply 90 from reservoir 90c is connected as a further input to proportional valve 76 (along with the output from shuttle valve 74 in circuit C1) with the proportional valve out put on line L5 being connected to the left and right rear solenoid valves 96L, 96R. Operating one of the rear solenoid valves (e.g. left rear solenoid valve 96L) disconnects the respective park brake 40L from the output of relay valve 94 and instead connects it to the output of proportional valve 76 on line L5. The effect of the proportional valve 76 is to reduce the opening pressure applied to the park brake 40L as the closure pressure on the corresponding service brake 38L is increased (so fluid pressure applied on the park brake is substantially inversely proportional to that applied on the service brake) such that the braking force applied by the park brake is substantially proportional to that applied by the service brake. This proportional application of the park brake during brake steering reduces the ground damage that may otherwise occur if maximum park brake force were applied regardless of service braking force (as would be the case with the above-mentioned combined park and service brake arrangement of DE9204417U1).

Figure 4:
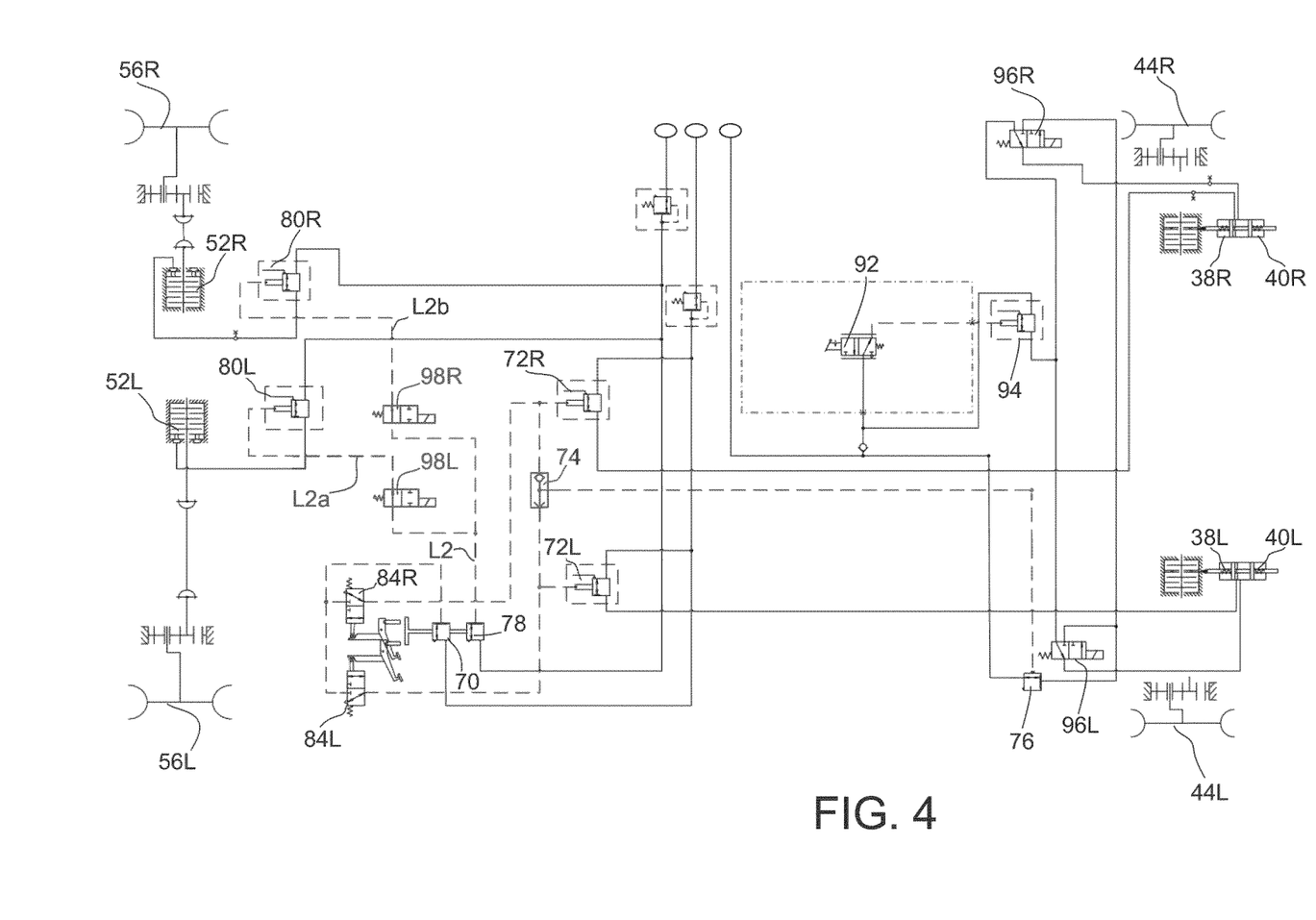
FIG. 4 is a schematic circuit diagram of a further embodiment of a pneumatically operable brake system for the tractor of FIG. 1.

FIG. 4 shows an alternative embodiment of the invention in which the pedal-operated front brake valves 86L, 86R are replaced by solenoid-operated valves 98L, 98R connected between the line L2 output of second control valve 78 and the respective front brake valves 80L, 80R operating left and right front service brakes 52L, 52R. Other components of the arrangement of FIG. 4 are the same as in FIG. 3, are denoted by the same reference numerals, and will not be further described.

The brake circuit shown in FIG. 4 may be adapted to a full electronic braking system (brake by wire) wherein the left rear brake valve 84L and the right rear brake valve 84R are not directly connected to two foot pedals 82L, 82R. Instead, solenoid valves are used to activate the rear service brakes 38L, 38R. The movement of the two foot pedals 82L, 82R may then be measured by sensors and forwarded to control unit 62, which in turn controls the solenoid valves. Furthermore, such a brake system may be provided with only one foot pedal. A further activation means may be provided so that the driver can activate steering brake operation or the system may automatically activate steering brake depending on sensed parameters (vehicle speed, field/road operation, etc.). Furthermore the park brake control valve 92 may be also solenoid valves (connected with control system 62) which is operable to connect the fluid supply, via a relay valve 94 and respective left and right rear solenoid valves 96L, 96R, to release or activate the park brakes 40L, 40R. In such an arrangement, the brake force of the park brake under normal operating condition, cannot be controlled by the driver, only ON/OFF condition is possible.

Though the above arrangement described is intended for use as a pneumatic circuit, the above described brake arrangement can also be operated hydraulically.

Figure 5:
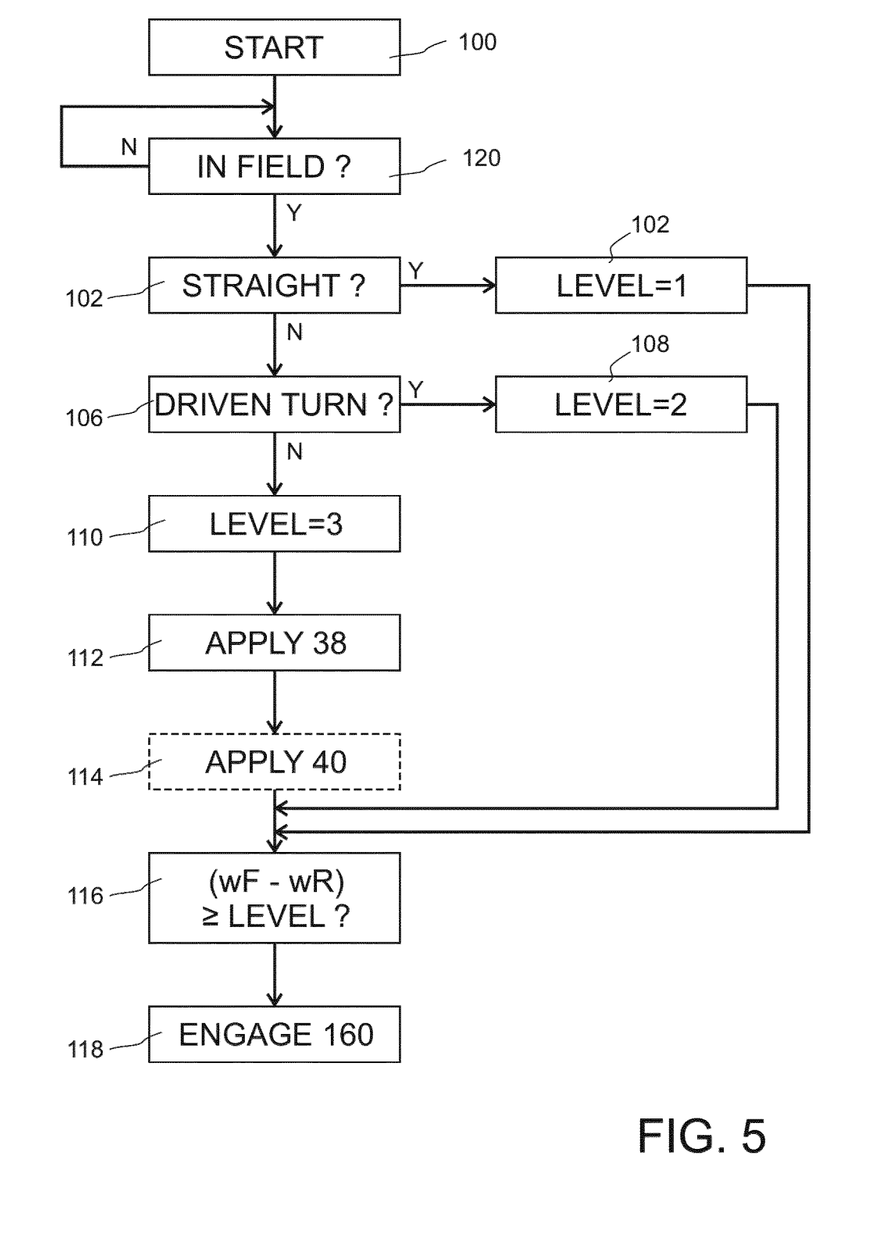
FIG. 5 represents a method of brake steering as may be effected by the tractor of FIG. 1.

FIG. 5 represents a method of brake steering as may be effected by the tractor 10 of FIG. 1 under the direction of the control system 62. From starting at 100, at step 102 a determination is made as to whether the tractor is travelling substantially straight. If so, at step 104 the wheel velocity difference value is set to the first and lowest value (LEVEL=1).

If the tractor is not travelling substantially straight, at step 106 a determination is made as to whether the tractor is travelling a driven turn. If so, at step 108 the wheel velocity difference value is set to the second and intermediate value (LEVEL=2).

If the tractor is neither travelling substantially straight nor a driven turn, which is indicative of steering braking, at step 110 the wheel velocity difference value is set to the third and highest value (LEVEL=3) for a steering braking turn, the service brakes 38 are applied on one or both of the wheels on the inside of the turn at step 112 and (as described above) optionally the parking brake 40 of the rear wheel on the inside of the turn may be applied at step 114.

Following the selection of the first or second wheel velocity difference threshold values at steps 104 and 108, or the application of the service brakes at step 112, a check is made at step 116 as to whether the current magnitude of wheel velocity difference value exceeds the currently selected threshold and, if so, at step 118 the first clutch 160 is engaged.

Figure 6:
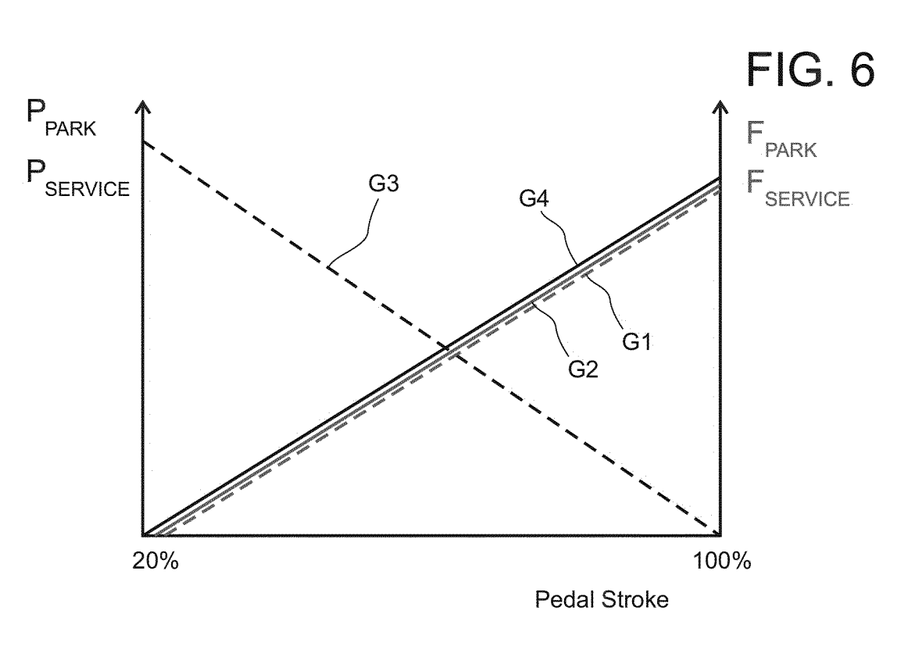
FIG. 6 represents a relationship between applied service and park brake forces.

As described above and represented in FIG. 6 (with the pedal stroke of pedals 82L or 82R depicted on the horizontal axis while the brake forces/fluid pressures are depicted on the vertical axis), the controllably varied level of braking force applied by the parking brake (as depicted with graph G1) is preferably substantially proportional to the level of applied service brake force (as depicted with graph G2) while the fluid pressure applied on the park brake (as depicted with graph G3) is substantially inversely proportional to that applied on the service brake (as depicted with graph G4). The graphs G1 and G2 may show equal values but are depicted with a small offset for clarity reasons. The pedal stroke shown on the horizontal axis starts with 20% which means that before the pedal has been depressed 20% of its total travel, no brakes are actuated but e.g. the brake lights are anyway switched on, e.g. at a stroke of 10% before the vehicle is braked.

Referring back to FIG. 5, the second and third wheel velocity difference values between the front and rear axles may be set to a fixed amount, e.g. 15% and 30%. Alternatively, an optional step may comprise actively adjusting the wheel velocity difference values based on external factors identified by the sensors 11, such as:
- gross weight of the vehicle;
- amount of front and/or rear ballasting carried by the vehicle;
- weighting information pertaining to a towed or carried implement;
- extent of measured wheel-slip for one or more wheels of the vehicle;
- tire pressure in one or more tires on respective wheels of the vehicle;
- angle of turn directed by a user of the vehicle;
- current speed of the vehicle;
- ambient conditions external to the vehicle.

If sensor input indicates the vehicle is heavier at the rear, the control system 62 may not activate the front service brake, while when the vehicle is heavier at the front, the system may not activate the additional brake force supplied by park brake. This situative brake control enables an efficient operation and avoids excessive brake force to reduce soil damages. An ABS sensor giving wheel velocity to determine tire slip may then be used for control of brakes and clutch.

As brake steering should only be used in field conditions, and not on the road, a further determination may be made at 120 prior to the start of a turn at 100 as to whether the vehicle is in a "safe" geographical location, namely a field. This determination may be made automatically in control system 62 on the basis of input from the geographical positioning system 15 (FIG. 1).

In the foregoing the applicants have described a method of brake steering in a four-wheel drive utility vehicle having a driven front axle carrying at least two front wheels, a driven rear axle carrying at least two rear wheels, a powertrain delivering torque to the front and rear axles via a connecting shaft, independently operable service brakes on each of the front and rear wheels, and independently operable parking brakes on each of the rear wheels. The method comprises, on the vehicle entering a turn, applying the service brakes of the front and rear wheels on the inside of the turn and applying also, and to a controllably varied level of braking force, the parking brake on the rear wheel on the inside of the turn.

From reading of the present disclosure, other modifications will be apparent to those skilled in the art. Such modifications may involve other features which are already known in the field of vehicle driveline and braking systems and component parts therefore and which may be used instead of or in addition to features described herein.

The invention claimed is:

1. A method of performing a brake steering turn in a four-wheel drive utility vehicle, the method comprising:
carrying at least two front wheels on a driven front axle assembly;
carrying at least two rear wheels on a driven rear axle assembly;
delivering torque to the front axle assembly via a transmission and a front drive shaft;
delivering torque to the rear axle assembly via the transmission and a rear drive shaft;
when the vehicle enters a turn, using independently operable service brakes of each of the front and the rear wheels on an inside of the turn to apply a braking force to each of the front and rear wheels on the inside of the turn; and
using an independently operable parking brake to apply a controllably varied level of braking force to the rear wheel on the inside of the turn in addition to the braking force applied by the service brakes;
wherein the service brakes on both the front and rear wheels on the inside of the turn and the parking brake on the rear wheel on the inside of the turn continue to be applied while the vehicle travels through the turn.

2. The method of brake steering as claimed in claim 1, wherein the level of braking force applied to the parking brake of the rear wheel on entering the turn is substantially proportional to a level of service braking force applied to the same wheel.

3. The method of brake steering as claimed in claim 1, wherein the level of force applied to the parking brake of the rear wheel on entering the turn is substantially inversely proportional to the level of force applied to the service breaks of the same wheel.

4. The method of brake steering of claim 1, wherein the level of service braking force and the level of braking force applied to the parking brakes during the turn is determined by a level of pressure exerted on a user operable brake control of the vehicle.

5. A driveline for a four-wheel drive utility vehicle, the driveline comprising:

a driven front axle assembly carrying at least two front wheels;

a driven rear axle assembly carrying at least two rear wheels;

a transmission configured for delivering torque to the front axle assembly via a front drive shaft and to the rear axle assembly via a rear drive shaft;

independently operable service brakes on each of the front and rear wheels;

independently operable parking brakes on each of the rear wheels; and a control system coupled with the transmission, the service brakes, and the parking brakes, the control system configured to detect when the vehicle enters a turn, and apply for a duration of the turn the service brakes of the front and rear wheels on the inside of the turn, and to also apply for the duration of the turn and to a controllably varied level of braking force, the parking brake on the rear wheel on the inside of the turn.

6. The driveline as claimed in claim 5, wherein the control system is configured to determine and apply the level of parking brake braking force to the rear wheel on entering the turn that is substantially proportional to a level of service braking force applied to the same wheel.

7. The driveline of claim 5, further comprising a user-operable brake control and sensor for determining a pressure applied to the brake control, wherein the control system is configured to set a level of service braking force applied during the turn based on the level of pressure exerted on the brake control.

8. A driveline for a four-wheel drive utility vehicle comprising:

a driven front axle assembly carrying at least two front wheels;

a driven rear axle assembly carrying at least two rear wheels;

a transmission configured for delivering torque to the front axle assembly via a front drive shaft and to the rear axle assembly via a rear drive shaft;

independently operable service brakes on each of the front and rear wheels;

independently operable parking brakes on each of the rear wheels;

a control system coupled with the transmission, the service brakes, and the parking brakes, the controls system configured to detect when the vehicle enters a turn, and apply for a duration of the turn the service brakes of the front and rear wheels on the inside of the turn, and to also apply for the duration of the turn and to a controllably varied level of braking force, the parking brakes on the rear wheel on the inside of the turn; and a controlled clutch arrangement in the transmission configured to limit a difference in wheel velocity between the front wheels and the rear wheels when a threshold value of the difference in wheel velocity between the front and rear wheels is reached, wherein the control system is coupled with the clutch arrangement and configured to increase the threshold value when the vehicle enters the turn.

9. The driveline as claimed in claim 8, wherein the control system is configured to detect when the vehicle enters the turn, and increase the threshold value to be approximately 30% higher compared to before entering the turn.

10. A utility vehicle comprising the driveline of claim 5.

11. The utility vehicle as claimed in claim 10, further comprising a geographical positioning system coupled with the control system, wherein the control system is configured to not implement brake steering on determination that the vehicle is outside of a predetermined geographical area.

\* \* \* \* \*